United States Patent

[11] 3,620,435

[72] Inventor Hidenobu Sogi
    Kurashiki, Japan
[21] Appl. No. 887,436
[22] Filed Dec. 22, 1969
[45] Patented Nov. 16, 1971
[73] Assignee Kuraray Co., Ltd.
    Sakazu, Kurashiki, Japan
[32] Priority Dec. 24, 1968
[33] Japan
[31] 43/95199

[54] FOOD PACKAGING CONTAINER COMPRISING MOLDED LAMINATED POLYETHYLENE AND ETHYLENE-VINYLALCOHOL
2 Claims, 2 Drawing Figs.

[52] U.S. Cl. ................................................ 229/3.5 R,
    161/247, 161/252, 264/22, 264/92, 264/294,
    264/296
[51] Int. Cl. ........................................................ B29c 23/00,
    B32b 27/08, B65d 3/00
[50] Field of Search........................................... 161/252,
    253, 247, 254, 256; 229/3.5 R; 264/22, 92, 294,
    296

[56] References Cited
UNITED STATES PATENTS

| | | | |
|---|---|---|---|
| 2,990,581 | 7/1961 | Rowe .......................... | 264/92 X |
| 3,048,511 | 8/1962 | Strawinski ..................... | 161/252 X |
| 3,282,729 | 1/1966 | Richardson et al. ........... | 161/252 X |
| 3,396,901 | 8/1968 | McFedries...................... | 229/3.5 X |
| 3,489,601 | 1/1970 | Stapp et al. ................... | 264/134 X |
| 3,505,441 | 4/1970 | Goetgheluck ................ | 264/92 X |
| 3,506,751 | 4/1970 | Lurie............................ | 264/134 |

FOREIGN PATENTS

| 684,081 | 4/1964 | Canada ........................ | 161/254 |

Primary Examiner—John T. Goolkasian
Assistant Examiner—C. B. Cosby
Attorney—Stepno and Neilan ABSTRACT: A packaging container for food comprising a molded laminated sheet of (1) ethylene-vinylalcohol copolymer layer, containing 30 to 60 mol percent of ethylene units and the balance of vinylalcohol units, and (2) a polyethylene layer having a melt index of from 0.1 to 10. The container is characterized by substantial gas, especially oxygen in air, and water impermeabilities; and has an opening mouth, sidewalls and bottom with the total area of the sidewalls and the bottom being not more than three times that of the opening mouth.

PATENTED NOV 16 1971    3,620,435
Fig. 1
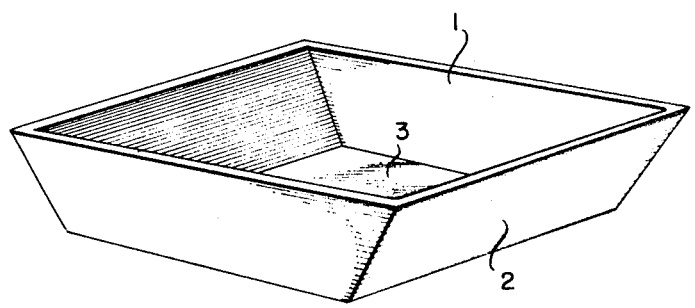
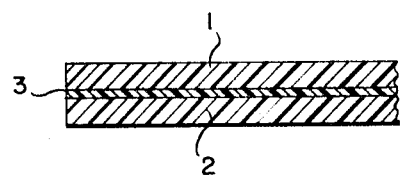
Fig. 2
INVENTOR.
Hidenobu Sogi
BY
Stepno & Neilan
ATTORNEYS

FOOD PACKAGING CONTAINER COMPRISING MOLDED LAMINATED POLYETHYLENE AND ETHYLENE-VINYLALCOHOL

The present invention relates to packaging containers and their production. More particularly, it relates to food packaging containers having the excellent gas impermeability, especially oxygen impermeability and excellent water impermeability which containers are made of a laminated sheet comprising (1) an ethylene-vinylalcohol copolymer sheet and (2) a polyethylene sheet by continuous molding.

It is already known that packaging containers mainly usable for packaging foods have heretofore been prepared by the plug assist method or other vacuum molding method, and by the matched molding method using plastic materials such as polyvinyl chloride, polystyrene or polycarbonate. However, these known packaging containers obtained from these various plastic materials are not fully satisfactory as containers for foods because of poor gas, especially oxygen in air, impermeability.

On the other hand, films or sheets made of ethylene-vinylalcohol copolymers due to processing problems have not been employed for the production of the packaging containers by the vacuum molding method or the matched molding method, although it is already known that said films or sheets have excellent gas, especially oxygen, impermeability.

Thus, if it were possible to readily prepare packaging containers of ethylene-vinylalcohol copolymer, by the vacuum molding method or matched mold process, the obtained containers would be evidently very useful as foods packages.

According to the studies of the inventor, it has been observed that, when a sheet of ethylene-vinylalcohol copolymer is heated for vacuum molding or matched molding, this sheet sags down owing to softening during heating to contact the metal molds and refrains from molding, and that, when molding can be executed, some creases are apt to appear around the mouth of the molds. Also, it has been evident in the matched molding method that, when continuous molding is effected, there is very high probability that a part may be made too thin thus resulting in inferior goods. Furthermore, there have occurred such troubles as the sheet not fitting the metal mold when the amount of heat is lowered to prevent the sagging of the sheet in the vacuum molding method. These facts shown that it is almost impossible to prepare containers by continuous molding from a single sheet of an ethylene-vinylalcohol vinylalcohol copolymer.

A primary object of this invention is to provide containers which make use of the excellent oxygen impermeability of an ethylene-vinylalcohol copolymer sheet and which containers are readily producible by continuous molding.

As results of various investigations for attaining the above object, the inventor has found that lightweight containers consisting of a laminated structure of an ethylene-vinylalcohol copolymer layer and a polyethylene layer can be readily prepared according to the vacuum molding method or the matched molding method employing special conditions, that there is observed little or no sagging of the laminated sheet during heating, and that inferior goods are hardly ever produced by the present method.

It has been discovered by the inventor that, by laminating a sheet of ethylene-vinylalcohol copolymer onto a sheet of polyethylene and subjecting the resulting laminated sheet to molding under temperature conditions to satisfy the two formulas (1) and (2):

$$-0.53X+90=Y=-1.6X+220 \quad (1)$$
$$-0.37X+52=Z=-0.53X+86 \quad (2)$$

wherein $X$, $Y$ and $Z$ have the meanings given below in the vacuum molding according to the plug assist method or in the matched molding; or subjecting said laminated sheet to molding under temperature conditions to satisfy formula (1) in the vacuum molding without using a plug; that the objective containers can be readily prepared by continuous molding. The desired containers are obtained essentially unaccompanied by the production of inferior goods, without defects and problems observed in the molding of the ethylene-vinylalcohol copolymer sheet only, with prevention of the sagging of sheet or film during continuous vacuum molding, and with prevention of sagging of the sheet or film while prohibiting the extreme thinning of a part of the sheet during the continuous molding by the matched molding method.

In formula (1), $X$ represents the ethylene content (mol percent) of the ethylene-vinylalcohol copolymer of the laminated sheet of $Y$ represents the temperature (°C.) in a middle phase or region of the copolymer (i.e., the inside $t/2$ a part from the outside surface when the thickness of the ethylene-vinylalcohol copolymer sheet or film is defined as $t$). This temperature was measured by inserting a thermometer between two ethylene-vinylalcohol copolymer sheets or films (of which thickness is half of the ethylene-vinylalcohol copolymer sheet layer in the laminated sheet to be molded), sticking them together and measuring under the same positions and same temperature conditions as those on the ethylene-vinylalcohol copolymer sheet layer in the molding of the said laminated sheet or films.

In formula (2), $Z$ represents the temperature (°C.) of the plug in the vacuum molding according to the plug assist method and the temperature (°C.) of the male and female molds in the matched molding method.

The matched molding method means a method of molding by putting the sheet between registering male and female molds (aligning mold: matched die mold) as described, for instance, in "Food Packing Technique Handbook" published on Feb. 10, 1968 by Nippon Seisansei Honbu, or "Processing of Thermoplastic Materials," Ernest C. Bernhardt and Dr. Eng. pages 448 and 449, published by Reinhold Publishing Corporation.

Vacuum molding according to the plug assist method means a method of molding by using a male mold which is almost symmetrical to the female mold as a plug (plug assist mold) for making the thickness uniform, pushing the warmed sheet suitable for molding into the female mold and opening a vacuum valve to adhere the sheet to the surface of the female mold. Vacuum molding without using a plug involves illustratively the direct method (or the straight method) of molding the warm and softened sheet directly in vacuum and the drape method of draping the sheet with a mold and finishing in vacuum. Any of these molding methods can be adopted in the process of this invention, but the method of vacuum molding according to the plug assist method and the matched molding method are more favorable from the point of thickness of the produced moldings for making the best use of the excellent oxygen impermeability of the ethylene-vinylalcohol copolymer.

When said thermal conditions for molding are not satisfied in any molding method, there may occur the same defects and problems as in the case of molding a single sheet of ethylene-vinylalcohol copolymer, such as hanging of the laminated sheet owing to softening during heating to contact with the metal mold, generation of creases around the opening mouth of the produced container, or adhesion of the container to the metal mold. Also, the sheet may not fit the metal mold during vacuum molding, and there may occur extreme thinning in a part of the produced container if the match molding method is used.

To achieve the objects of the invention, in addition to the aforementioned molding conditions, it is necessary to adhere the ethylene-vinylalcohol copolymer sheet to the polyethylene sheet so as to keep the peel strength above 30 g. when measured at 20° C. in 90° of the separate angle per 1 cm. of the breadth before molding. When a filled container having a peel strength of less than 30 g./cm. falls, a separation between the two layers is apt to occur together with spoilage of the appearance of the container and a consequent substantial lowering of the market value.

For example, containers prepared by laminating a sheet (0.2 mm. thick) of ehtylene-vinylalcohol copolymer (ethylene content =54 mol percent) onto a sheet (0.2 mm. thick) of polyethylene by various separate adhesions and molding the laminated sheet were filled with contents and dropped from a height of 1 m. onto a concrete floor, and the results regarding separation are shown in table 1.

TABLE 1.—RESULTS RE SEPARATION

| Peel strength (g./cm.) | A container produced by vacuum holding according to the straight method | A container produced by vacuum molding according to the plug assist method | A container produced by the matched molding method |
|---|---|---|---|
| 130 | No separation | No separation | No separation. |
| 100 | do | do | Do. |
| 80 | do | do | Do. |
| 50 | do | do | Do. |
| 30 | Separations occurred in about 0.6% of the fallen containers. | Separations occurred in about 0.5% of the fallen containers. | Separations occurred in about 0.5% of the fallen containers. |
| 28 | Separations occurred in about 11% of the fallen containers. | Separations occurred in about 10% of the fallen containers. | Separations occurred in about 10% of the fallen containers. |

For preparing containers having excellent oxygen impermeability and pleasing appearance with a high molding efficiency, it is also important to suitably select the composition of the ethylene-vinylalcohol copolymer, the composition of polyethylene, the thickness of both the sheet of ethylene-vinylalcohol copolymer and the polyethylene sheet, and shape of the container.

The ethylene-vinylalcohol copolymer used in this invention must be a copolymer obtained by converting more than 95 percent of vinyl acetate unit in the ethylene-vinylacetate copolymer consisting of 30 to 60 mol percent of ethylene and 40 to 70 mol percent of vinyl acetate into the vinylalcohol unit. When the ethylene content is less than 30 mol percent, it is very difficult to prepare the container by laminating the copolymer to polyethylene because of the increase of the softening temperature which enlarges the difference from the softening temperature of polyethylene. When the ethylene content is more than 60 mol percent, the oxygen impermeability becomes smaller so that the favorable characteristics of the ethylene-vinylalcohol copolymer are lost. When the conversion rate (equal to the saponification degree) of the vinyl acetate unit into the vinylalcohol unit is less than 95 percent, the hygroscopic quality and the suction becomes larger, the oxygen impermeability under high humidity is smaller, and the elasticity becomes lower so that the rigidity necessary for the container is lost.

The polyethylene used in this invention may be high density polyethylene prepared by any one of the low-pressure methods, moderate density polyethylene prepared by the middle pressure method, or low density polyethylene produced by the high pressure method. A copolymer of ethylene with a small amount of other mono-olefin series monomer, e.g., propylene etc. may also be used but the melt index must be within the range from 0.1 to 10. From the standpoint of transparency and the like, it may be more favorable to use polyethylene prepared by the high-pressure method which has a melt index within said range. When the melt index is more than 10, the viscosity of the polyethylene is considerably low when the laminated sheet of the ethylene-vinylalcohol copolymer becomes warm enough to be molded, and many inferior moldings may occur. When the melt index is less than 0.1, it is difficult to prepare a uniform sheet and the surface becomes rough and spoils the appearance when the containers are prepared by laminating a sheet of ethylene-vinylalcohol copolymer onto a polyethylene sheet. The term "melt index" means the melt index ordinarily used.

Further, it is necessary to use a laminated sheet of 0.06 to 1 mm. thickness prepared from the ethylene-vinylalcohol copolymer and the polyethylene layers. The thickness of the polyethylene layer in the laminated sheet must be 20 to 80 percent of that of the laminated sheet. When the thickness of the laminated sheet is less than 0.06 mm., the sheet may break during molding. When the thickness of the laminated sheet is more than 1 mm., the warming time up to the temperature necessary for molding may be prolonged and the molding cycle becomes longer and the container cannot be manufactured economically. When the thickness of the polyethylene layer in the laminated sheet is less than 20 percent, there is no merit to laminating polyethylene to the ethylene-vinylalcohol layer since such a structure has the same defects and problems as in the molding of a single sheet of the ethylene-vinylalcohol copolymer. When the thickness of the polyethylene layer is more than 80 percent, the thickness of the ethylene-vinylalcohol copolymer layer becomes so thin that there is a remarkable reduction in the rigidity of the container, the preservation of the contents, and in the prevention of odor.

The container obtained by the present invention may be limited in shape according to the size of the opening mouth. When the area of the opening mouth of the container is defined as A cm.$^2$ and the area of the outside surface which consists of the total area of sidewalls and bottom of the container is defined as B, B/A must be less than 3, and preferable at the range of about 1.2 to 3. When B/A is not less than 3, the preservation of the contents of the container, the prevention of odor, and the rigidity of the container decrease rapidly.

Although it is possible to mold the container with the ethylene-vinylalcohol layer as either the outside or the inside layer of the container, the former is more favorable since it gives an improved appearance.

Since the containers obtained by laminating the ethylene-vinylalcohol copolymer and the polyethylene sheets according to the present invention while satisfying the above conditions have larger oxygen impermeability, greater water-proofness, less occurrence of pinholes, less susceptibility to damage by agitation or fall, excellent flavor-preservation, antiodor and oilproof qualities, these containers can be used for packing foods which are easily discolored and denatured such as tomato catsup, Japanese bean paste "miso," mayonnaise, oil foods, orange or jam, and/or utilized for packing foods whose flavors are desired to be preserved such as pickles or curry.

Presently preferred and practical embodiments of the present invention are illustratively shown in the following examples.

EXAMPLE 1

A sheet (0.2 mm. thick) of the ethylene-vinylalcohol copolymer (ethylene content: 32 mol percent, saponification degree: 99.5 percent) was laminated onto a sheet (0.2 mm. thick) of polyethylene (melt index: 7.0, density: 0.943 g./cm.$^3$) with a synthetic rubber adhesive. The peel strength of the laminated sheet was 340 g./cm. The laminated sheet was molded according to the matched mold process under conditions to keep the temperature of the male and female molds at 60° C. and the temperature in a middle phase of the ethylene-vinylalcohol copolymer layer at 140° C. to prepare a packaging container having the shape of a truncated cone (diameter of the mouth: 95 mm., depth: 95 mm., depth: 45 mm., diameter of the bottom: 85 mm.) and having the ethylene-vinylalcohol copolymer on the outside of the container. The thickness of the container was 0.152 mm. in the sidewall and 0.328 mm. in the bottom. B/A is 2.59 wherein A represents the area of the opening mouth and B represents the outside area of the container. The inside of the container was filled with tomato catsup and the opening was closed tightly by heat sealing using the same laminated sheet as used for molding. The filled and sealed container was allowed to stand at 30° C. and 80 percent R.H. for 3 months, and hardly any change of color was observed. The same container was allowed to stand at 30° C. and 20 to 30 percent R.H. for 3 months, and the decrease of the content's weight was 0.8 percent. When thus prepared, filled and sealed containers were dropped from a height of 1 m. height onto a concrete floor, the damage rate (ratio of the damaged containers to total fallen containers) was 0.4 percent at 30° C. and 6.8 percent at 1° C. There was observed no separation between the ethylene-vinylalcohol copolymer layer and the polyethylene layer following a falling test.

EXAMPLE 2

A sheet (0.3 mm. thick) of an ethylene-vinylalcohol copolymer (ethylene content: 42 mol percent, saponification degree: 98.6 percent) was laminated onto a sheet (0.2 mm. thick) of polyethylene (melt index: 3.0, density: 0.934 g./cm.[3]) with an acrylic resinous adhesive. The peel strength of the sheet was 260 g./cm. The laminated sheet was molded according to the matched mold process under conditions to keep the temperature of the male and female molds at 50° C. and the temperature in a middle phase of the ethylene-vinylalcohol copolymer layer at 125° C. to prepare a container having the shape of a truncated pyramid (a side of the square opening: 90 mm., depth: 45 mm., a side of the square bottom; 80 mm.) and the outside of the container consisting of the layer of ethylene-vinylalcohol copolymer. The thickness of the container was 0.280 mm. in the sidewall and 0.380 mm. in the bottom wall. B/A is 2.68 wherein A represents the area of the opening mouth and B represents the outside area of the container. The inside of the container was filled with Japanese bean paste, so-called "Shinshu miso," and the opening mouth was closed tightly by heat sealing using the same laminated sheet as described above. The packed substance was allowed to stand at 30° C. and 80 percent R.H. for 3 months, and hardly any change in color was observed. When the same filled and sealed container was allowed to stand at 30° C., 20 to 30 percent R.H. for 3 months, the decrease of the content's weight was only 0.3 percent. When the same containers were dropped from a height of 1 m. onto a concrete floor, the damage rate was 0.2 percent at 30° C. and 3.6 percent at 1° C. No separation of the laminated sheet was observed by the falling test.

EXAMPLE 3

A sheet (0.2 mm. thick) of ethylene-vinylalcohol copolymer (ethylene content: 54 mol percent, saponification degree: 99.2 percent was laminated onto a sheet (0.2 mm. thick) of polyethylene (melt index: 1.0, density: 0.918 g./cm.[3]) with a modified vinylic resinous adhesive. The peel strength of the laminated sheet was 170 g./cm. The laminated sheet was molded according to the matched mold process under conditions to keep the temperature of the male and female molds at 30° C. and the temperature in a middle phase of the ethylene-vinylalcohol copolymer layer at 110° C. to prepare containers having a size and shape as given in example 1 and having the ethylene-vinylalcohol copolymer as the outside layer. The thickness of the container was 0.140 mm. in the sidewall and 0.308 mm. in the bottom. The container was filled with mayonnaise, and the opening was closed tightly by heat sealing using a laminated sheet as described above. The packed container was allowed to stand at 30° C. and 80 percent R.H. for 3 months. No change of the color was found and hardly any change of the peroxide value in the oily component was observed. The same filled and sealed container was allowed to stand at 30° C. and 20 to 30 percent R.H. for 3 months and the decrease of the content's weight was 0.2 percent. Containers were dropped from a height of 1 m. and the damage rate was 0.0 percent at 30° C. and 0.2 percent at 0° C. No separation of the laminated sheet was observed by the falling test.

EXAMPLE 4

A sheet (0.2 mm. thick) of an ethylene-vinylalcohol copolymer (ethylene content: 32 mol percent, saponification degree: 99.5 percent) was laminated onto a sheet (0.2 mm. thick) of polyethylene (melt index: 7.0, density: 0.943 g./cm.[3]) with a synthetic rubber adhesive. The peel strength of the sheet was 340 g./cm. The laminated sheet was vacuum molded according to the plug assist method under conditions to keep the temperature of the plug at 60° C. and the temperature in a middle phase of the ethylene-vinylalcohol copolymer layer at 140° C. to prepare containers having a size and shape as in example 1 and having an outside layer of ethylene-vinylalcohol copolymer. The thickness of the container was 0.150 mm. in the sidewall and 0.325 mm. in the bottom. B/A was 2.59 when the area of the opening mouth was A and that of the outside surface was B. The container was filled with tomato catsup, and the opening mouth was closed tightly by heat sealing, using a laminated sheet as described above. The filled and sealed container was allowed to stand at 30° C. and 20 to 30 percent R.H. for 3 months, the decrease of the content's weight was only 0.8 percent. When filled vessels were dropped from a height of 1 m. onto a concrete floor, the damage rate was 0.4 percent at 30° C. and 6,8 percent at 1° C. No separation of the laminated sheet between the ethylene-vinylalcohol copolymer layer and the polyethylene layer was observed by the falling test.

EXAMPLE 5

A sheet (0.3 mm. thick) of ethylene-vinylalcohol copolymer (ethylene content: 42 mol percent, saponification degree: 98.6 percent) was laminated onto a sheet (0.2 mm. thick) of polyethylene (melt index: 3.0, density: 0.934 g./cm.[3]) with an acrylic resinous adhesive. The peel strength was 260 g./cm. The laminated sheet was vacuum molded according to the plug assist method under conditions to keep the temperature of the plug at 50° C. and the temperature in a middle phase of the ethylene-vinylalcohol copolymer layer at 125° C. to prepare a container having a size and shape as in example 2 and having an outside layer of ethylene-vinylalcohol copolymer. The thickness of said container was 0.183 mm. in the sidewall and 0.370 mm. in the bottom. The container was filled with Japanese bean paste, so-called "Shinshu miso," and the opening mouth was closed tightly by heat sealing using a laminated sheet prepared as described above. The packed substance was allowed to stand at 30° C. in circumstances of 80 percent R.H. for 3 months, and hardly any change of color was observed. The same filled and sealed container was allowed to stand at 30° C. in circumstances of 20 0.1 30 percent R.H. for 3 months 3.6 the decrease of the content's weight was 0.3 percent. When similarly prepared, filled and sealed containers were dropped from a height of 1 m. onto a concrete floor, the damage rate was 0.1 percent at 30° C. and 3.6 percent at 1° C. No separation of the laminated sheet was observed by the falling test.

EXAMPLE 6

A sheet (0.2 mm. thick) of ethylene-vinylalcohol copolymer (ethylene content: 54 mol percent, saponification degree: 99.3 percent) was laminated onto a sheet (0.2 mm. thick) of polyethylene (melt index: 1.0, density: 0.918 g./cm.[3]) with a modified vinylic resinous adhesive. The peel strength of the sheet was 170 g./cm. The laminated sheet was vacuum molded according to the plug assist method under conditions to keep the temperature of the plug at 30° C. and the temperature in a middle phase of ethylene-vinylalcohol copolymer sheet at 110° C. to prepare a container having a size and shape as in example 1 and having an outside layer of ethylene-vinylalcohol copolymer. The thickness of the vessel was 0.145 mm. in the sidewall and 0.300 mm. in the bottom. The container was filled with mayonnaise, and the opening mouth was closed tightly by heat sealing, using a laminated sheet as described above. The packed substance was allowed to stand at 30° C. in circumstances of 80 percent R.H. for 3 months. No change of the color was observed and hardly any change of the peroxide value in the oily component was observed. When the same filled and sealed container was also allowed to stand at 30° C. and 20 to 30 percent R.H. for 3 months, the decrease of the content's weight was only 0.2 percent. When thus prepared charged containers were dropped from a height of 1 m. onto a concrete floor, the damage rate was 0.0 percent at 30° C. and 0.2 percent at 0° C. No separation of the laminated sheet was observed by the falling test.

EXAMPLE 7

A sheet (0.2 mm. thick) of ethylene-vinylalcohol copolymer (ethylene content: 32 mol percent, saponification degree: 99.5 percent) was laminated onto a sheet (0.2 mm. thick) of polyethylene (melt index: 7.0, density: 0.943 g./cm.$^3$) with a synthetic rubber adhesive. The peel strength of the laminated sheet was 340 g./cm. The laminated sheet was vacuum molded according to the straight method under conditions to keep the temperature in a middle phase of the ethylene-vinylalcohol copolymer layer at 140° C. to prepare containers having a size and shape as in example 1 and having an outside layer of ethylene-vinylalcohol copolymer. The thickness of the container was 0.176 mm. in the sidewall and 0.136 mm. in the bottom. The container was filled with tomato catsup, and the opening mouth was closed tightly by heat sealing, using the same laminated sheet as described above. A charged container was allowed to stand at 30° C. in circumstances of 80 percent R.H. for 3 months, and hardly any change of color was observed. When a charged container was allowed to stand at 30° C. and 20 to 30 percent R.H. for 3 months, the decrease of the content's weight was only 0.9 percent. Charged containers were dropped from 1 m. height onto a concrete floor and the damage rate was 0.6 percent at 30° C. and 7.3 percent at 1° C. No separation of the laminated sheet between the layer of ethylene-vinylalcohol copolymer and the polyethylene layer was observed by the falling test.

EXAMPLE 8

A sheet (0.3 mm. thick) of ethylene-vinylalcohol copolymer (ethylene content: 42 mol percent, saponification degree: 98.6 percent) was laminated onto a sheet (0.2 mm. thick) of polyethylene (melt index: 3.0, density: 0.934 g./cm.$^3$) with an acrylic resinous adhesive. The peel strength was 260 g./cm. The laminated sheet was vacuum molded according to the straight method under conditions to keep the temperature in a middle phase of the ethylene-vinylalcohol copolymer layer at 125° C. to prepare containers having a size and shape as in example 2 and having an outside layer of ethylene-vinylalcohol copolymer. The thickness of the container was 0.210 mm. in the sidewall and 0.160 mm. in the bottom. The container was filled with "Shinshu miso," and the opening mouth was closed tightly by heat sealing, using a laminated sheet as described above. The packed substance was allowed to stand at 30° C. in circumstances of 80 percent R.H. for 3 months, and hardly and change of color was observed. When a charged container was allowed to stand at 30° C. in circumstances of 20 to 30 percent R.H. for 3 months, the decrease of the content's weight was only 0.35 percent. When charged containers were dropped from a height of 1 m. onto a concrete floor, the damage rate was 0.2 percent at 30° C. and 4.0 percent at 1° C. No separation of the laminated sheet forming the container was observed by the falling test.

EXAMPLE 9

A sheet (0.2 mm. thick) of ethylene-vinylalcohol copolymer (ethylene content: 54 mol percent, saponification degree: 99.2 percent) was laminated onto a sheet (0.2 mm. thick) of polyethylene (melt index: 1.0, density: 0.918 g./cm.$^3$) with a modified vinylic resinous adhesive. The peel strength of the laminated sheet was 170 g./cm. The laminated sheet was vacuum molded according to the straight method under conditions to keep the temperature in a middle phase of the ethylene-vinylalcohol copolymer sheet at 110° C. to prepare containers having a size and shape as in example 1 and having an outside layer of ethylene-vinylalcohol copolymer. The thickness of the container was 0.176 mm. in the sidewall and 0.140 mm. in the bottom. The container was filled with mayonnaise, and the opening mouth was closed tightly by heat sealing, using a laminated sheet prepared as described above. The filled and sealed container was allowed to stand at 30° C. and 80 percent R.H. for 3 months. No change of the color was observed and hardly any change of the peroxide value in the oily component was observed. When the same filled and sealed container was allowed to stand at 30° C. and 20 to 30 percent R.H. for 3 months, the decrease of the content's weight was only 0.2 percent. When charged containers fell from a height of 1 m., the damage rate was 0.0 percent at 30° C. and 0.2 percent at 0° C. No separation of the laminated sheet was observed by the falling test.

FIG. 1 is an oblique view of a packaging container of a type useful in this invention, and FIG. 2 is a fragmentary sectional view of a portion of sidewalls and a bottom of a packaging container consisting of a laminated sheet of (1) an ethylene-vinyl alcohol copolymer layer and (2) a polyethylene layer in accord with this invention. Said layers are allowed to adhere with an adhesive. (3).

As seen in FIG. 1, a container has an opening mouth 1, sidewalls 2 and a bottom 3. The total area of the sidewalls and a bottom is not more than three times the area of the opening mouth. The sidewalls and a bottom of the container are typically formed of a laminated sheet as seen in FIG. 2. In accord with the invention, the outside surface of said walls and bottom are (1) an ethylene-vinyl alcohol copolymer layer of a laminated sheet, and the inside surface of said walls and bottom are (2) a polyethylene layer of said laminated sheet.

What is claimed is:

1. A packaging container, said container being characterized by substantial gas , especially oxygen, and water impermeability and having an opening mouth, sidewalls and a bottom; the total area of the sidewalls and the bottom being not more than three times the area of the opening mouth; said sidewalls and said bottom consisting essentially of a laminated sheet of 0.06 to 1.0 mm. thickness of (1) an ethylene-vinylalcohol copolymer layer consisting essentially of from 30 to 60 mol percent of ethylene units and the balance of vinylalcohol units and (2) a polyethylene layer having a melt index of from 0.1 to 10, the thickness of said polyethylene layer being 20-80 percent of the thickness of said laminated sheet.

2. A packaging container according to claim 1, wherein the outside surface of said container is said ethylene-vinylalcohol copolymer layer of the laminated sheet and the inside surface of said container is said polyethylene layer of the laminated sheet.

* * * * *